(12) United States Patent
Lee et al.

(10) Patent No.: US 6,876,388 B1
(45) Date of Patent: Apr. 5, 2005

(54) INTERLACED ALTERNATING PIXEL DESIGN FOR HIGH SENSITIVITY CMOS IMAGE SENSORS

(75) Inventors: Sywe N. Lee, Taipei Hsien (TW); David Wayne, Scottsdale, AZ (US)

(73) Assignee: Taiwan Advanced Sensors Corporation, Taipei Hsien (TW)

( * ) Notice: Subject to any disclaimer, the term of this patent is extended or adjusted under 35 U.S.C. 154(b) by 0 days.

(21) Appl. No.: 09/497,051

(22) Filed: Feb. 2, 2000

(51) Int. Cl.[7] .......................... H04N 3/14; H04N 5/335
(52) U.S. Cl. ...................................... 348/305; 348/308
(58) Field of Search ................................ 348/273, 294, 348/302, 305, 308

(56) References Cited

U.S. PATENT DOCUMENTS

| | | | | |
|---|---|---|---|---|
| 4,471,387 A | * | 9/1984 | Nadler | 358/497 |
| 4,542,409 A | * | 9/1985 | Ochi | 348/281 |
| 5,446,493 A | * | 8/1995 | Endo et al. | 348/320 |
| 5,576,763 A | * | 11/1996 | Ackland et al. | 348/308 |
| 5,581,357 A | * | 12/1996 | Sasaki et al. | 348/235 |
| 5,900,623 A | | 5/1999 | Tsang et al. | |
| 6,249,643 B1 | * | 6/2001 | Mimura | 386/107 |

OTHER PUBLICATIONS

U.S. Appl. No. 09/103,959, filed Jun. 24, 1998.

* cited by examiner

*Primary Examiner*—Wendy R. Garber
*Assistant Examiner*—Timothy J. Henn
(74) *Attorney, Agent, or Firm*—Fulbright & Jaworski LLP

(57) ABSTRACT

A structure of an image sensor for sensing the light of an image impinging thereupon and for translating the image into a standard television format is disclosed. The structure comprises a plurality of first and second light detecting elements (22, 23) arranged in rows and columns and half as many rows and columns as scan lines of a television format for generating respective analog signals in proportion to the intensity of the light impinging respectively on each of the first and second light detecting elements (22, 23), wherein the first and second light detecting elements in each row are alternately disposed and activated by first read lines RDOn (n=1 ... 256) to generate odd field signals, and wherein the first and second light detecting elements (22, 23) of two adjacent rows disposed in a zigzag or serrated manner are activated by second read lines RDEn (n=1 ... 256) to generate even field signals.

5 Claims, 6 Drawing Sheets

INTERLACED ALTERNATING PIXEL DESIGN FOR HIGH SENSITIVITY CMOS IMAGE SENSORS

FIELD OF INVENTION

The present invention relates to a CMOS type image sensor and, in particular, to a special pixel arrangement to enhance the sensitivity and picture quality of CMOS type image sensors.

BACKGROUND OF INVENTION

An image sensor is used to transform an optical image focused on the sensor into electrical signals. The image sensor typically contains an array of light detecting-elements, wherein each element produces an analog signal in response to the light intensity of an image impinging on the element when the image is focused on the array. These signals from the sensor array may then be used to display a corresponding image on a monitor.

One very well known type of an image sensor is the charge-coupled device (CCD). Integrated circuit chips containing CCD image sensors are expensive because of the specific A manufacture process required. The CCD also requires relatively large power dissipation, because of the required clock signals and the high voltage that is usually needed. Compared with the CCD image sensor, a CMOS active pixel sensors (APS) have attracted much attention recently because of its capability of monolithic integration of the circuits of control, drive and signal processing into a single sensor chip. The advantages of the CMOS APS imager are: low voltage operation and low power consumption, process compatibility with on-chip electronics, and potentially lower cost, as compared with the conventional CCD. This is derived from the wide availability of a standard CMOS manufacturing process.

However, it is well known that the CMOS image sensor suffers from noises which will adversely degrade the performance. These noises include kTC noise associated with the sampling of the image data; 1/f noise associated with the circuits used to amplify the image signal; and fixed pattern noise associated with non-uniformity, primarily between columns within the array. These noises significantly become major factors causing the CMOS active pixel sensor to have a lower sensitivity or a lower dynamic range compared to the CCD.

FIG. 1A illustrates the architecture of a conventional CMOS image sensor of 512 by 512 active pixels formed on a single integrated circuit chip. Some examples of the conventional CMOS image sensors can be seen in U.S. patent application Ser. No. 09/103,959, U.S. Patent Application entitled "INTERLACE OVERLAP PIXEL DESIGN FOR HIGH SENSITIVITY CMOS IMAGE SENSORS," and U.S. Pat. No. 5,900,623 both of which were assigned to the same assignee of the present application. An image sensor core 19 comprises a two dimensional pixel array of light detecting elements 10 which include identical circuitry shown in FIG. 1B. When sensing, an image is focused on the image sensor core 19 such that different portions of the image impinges on each light detecting element 10. As shown in FIG. 1B, each light detecting element 10 comprises a photodiode 20, or an equivalent photo sensing device, such as a photogate, bipolar phototransistor, etc., the conducting current of which is in proportion to the intensity of the light impinging upon the junction of the photo sensing device.

At the beginning of the exposure cycle, an internal column line 24 is isolated because an access transistor T3 is turned off due to the inactive state of the read signal (RD). The photodiode 20 is initially reset to a value close to Vref level by means of a reset transistor T1, which is turned on by the active high state of the reset signal RST output from the row address shift register (not shown). All the operations of the conventional CMOS image core 19 can be illustrated with reference to U.S. patent application Ser. No. 09/103,959 filed on Jun. 24, 1998 by the same applicant, which is incorporated herein by reference.

The exposure commences as the reset transistor T1 is turned off by the inactive state of the signal RST. This allows the photodiode current, due to the light impinging on it, to discharge the capacitance of the floating node Nd, thereby reducing the charge on node Nd. The exposure time starts at the falling edge of the RST signal and stops at the rising edge of the subsequent RST signal. After a sufficient time from the commencement of the exposure time, which may be varied to provide different image sensitivity or exposure control, the access transistors T3 in the row are turned on by an active RD signal for the row. This causes the photodiode voltage at node Nd, translated through a source follower transistor T2 and the access transistor T3, to be coupled to the internal column line 24. The voltage is offset by the source follower transistor T2, and, of course, will vary with the characteristics of the transistor T2. This voltage will be sampled and held in a following correlated double sampling (CDS) circuit (not shown) at the end of the column line 24. At the end of the exposure interval, the reset transistors T1 in the row are then turned on again, causing the input of the source follower T2, which is coupled to the cathode node P of photodiode 20, to be reset to a value close to the Vref. The actual signal sensed by the CDS circuit is the difference of signals at node C, denoted as Vc, before and after the reset signal RST is activated. The subtraction of the signals of the node C at different moments is accomplished by the well known CDS circuitry, which will not be described in detail in this invention. In accordance with the above principle, as shown in FIG. 1B, the photodiodes 20 in each row are exposed to generate the voltage signal to the column lines in response to the reset signal for the row, i.e., RSTn, n=1 . . . 512 as well as the corresponding read signal RDn, and the reset signal for each row is activated sequentially in time to obtain the voltage differences for all rows.

In the NTSC (National Television Standards Committee) television system, the television picture, as an example, adopted for a solid state sensor is composed of a plurality of image pixels arranged in on the order of 500 horizontal rows. The picture is divided into an odd field and an even field. Odd numbered lines 1, 3, 5, etc., of a television picture are scanned first and displayed in the odd field. After the odd field has been scanned, the even numbered lines 2, 4, 6, etc., of the television picture are scanned and displayed in the even field. The scanning scheme in which the odd field is interlaced with the even field is so-called interlaced scanning.

For compatibility reasons, the NTSC scanning scheme has been carried over to the digital camera employing the CMOS image sensor. For a conventional NTSC interlaced scanning scheme, a pixel array of, for example, 512 by 512 pixels would be first scanned in an order of rows 1, 3, 5, 7, . . . and 511 for the odd field time by sequentially activating the reset signals RSTm, m=1, 3, 5, 7, . . . 511, then rows 2, 4, 6, 8, . . . , and 512 for the even field time by sequentially activating the reset signals RSTm, m=2, 4, 6, 8, . . . 512 under the control of the row address shift register, wherein each field takes roughly 1/60 second within the 1/30 second frame time. In this conventional method, as shown in FIG. 1B, there are 512 access transistors T3 as well as source follower amplifiers T2, and 512 floating sensing nodes Nd per row in the array. Each floating sensing node Nd is driven by one photodiode.

In a second conventional method, interlaced scanning is accomplished by simply re-scanning the same row for both the odd and even fields. This method reduces the required number of rows by a factor of two, which simplifies the imager, reducing its size, complexity and cost. The disadvantage, however, is that the vertical position of the row for the even field, for example, is incorrect by one-half the row spacing. Thus, the vertical resolution of the sensor is inevitably reduced. This method is employed by all present CCD or CMOS sensors having on the order of 256 rows. Details of the operation may be found in the manufacturers' technical information of such devices.

The analog signals produced by the light detecting elements 10 are apt to be contaminated by the above-mentioned types of noise, causing CMOS active pixel sensors to have a lower sensitivity or a lower dynamic range than the CCD.

Therefore, improvements in sensitivity, dynamic range, and resolution become critical technical challenges for CMOS image sensor designers. The present invention intends to increase pixel sensitivity and to improve the overall image quality through a special pixel design arrangement.

SUMMARY OF INVENTION

An active pixel image sensor fabricated by a CMOS process is described herein which includes a two-dimensional pixel array core of photodiodes, the conductivity of which is related to the intensity of light impinging upon each of the photodiodes. The analog signal thus generated is buffered through a source follower amplifier, accessed by row transistors and coupled to respective columns in the array.

According to one preferred embodiment of the present invention, another access transistor coupling each of two adjacent row pixel photodiodes in the column direction, only half the number of source followers and access transistors than the conventional CMOS image sensor are needed, thus significantly reducing the number of elements in the CMOS sensors.

According to one preferred embodiment of the present invention, the access scheme of the present invention is changed by coupling another access transistor T4 in parallel to the original access transistor T3 in each light detecting element 10 of FIG. 1A, wherein the access transistors T4 in two adjacent light detecting elements 10 of the same row are coupled to respective two RD signals. According to the present invention, the array is scanned with alternating row activating signals RDO1, RDO2, . . . , RDO256 sequentially for the odd field and RDE1, RDE2, . . . , RDE256 sequentially for the even field, wherein the light detecting elements 10 in a row activated by even field activating signals RDEn (n=1 . . . 256) are alternately disposed and have a "zigzag" or serrated arrangement. This has the result that the average vertical location of the even field lines is identical with that of the first conventional method above. This approach provides better picture image quality than the conventional technique, which repeatedly scans the same rows for both odd and even fields. In addition, because only half the number of rows than the first conventional method detailed above is used, the size and cost of the imager are significantly reduced.

Therefore, one advantage of the present invention is to significantly reduce the size and manufacturing cost of the CMOS sensor by a special pixel design arrangement, while still maintaining or even enhancing the pixel sensitivity and image quality thereof.

Another advantage of the present invention is to increase the pixel sensitivity and to improve the overall image quality by a special pixel design arrangement.

BRIEF DESCRIPTION OF THE DRAWINGS

Other aspects and advantages of the invention will become apparent from the following descriptions taken in conjunction with the accompanying drawings, wherein.

DETAILED DESCRIPTION OF THE PREFERRED EMBODIMENT

Figure 1A:
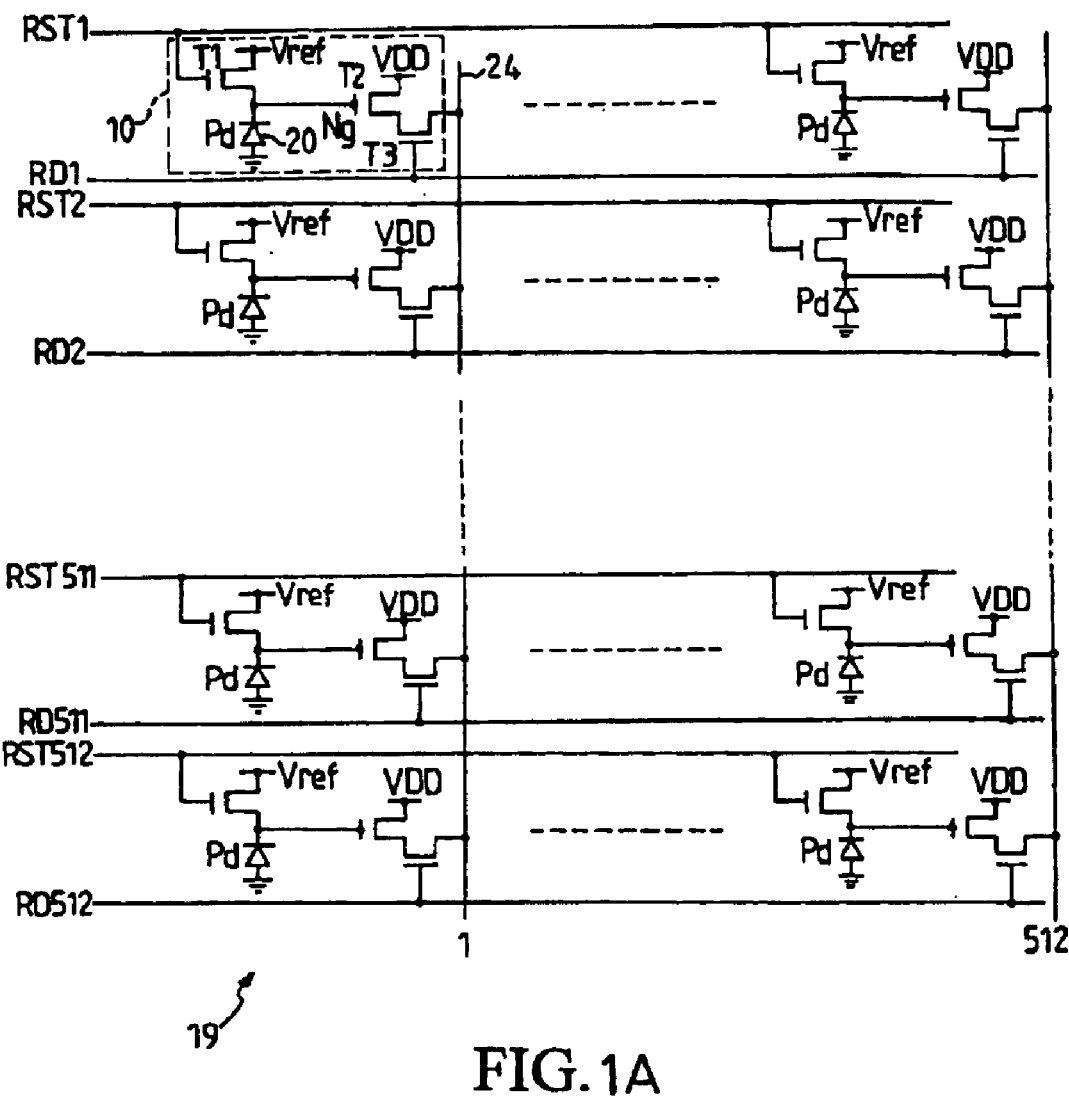
FIG. 1A shows a simplified schematic block diagram of a conventional CMOS image sensor consisting of 512 by 512 active pixels.
Figure 1B:
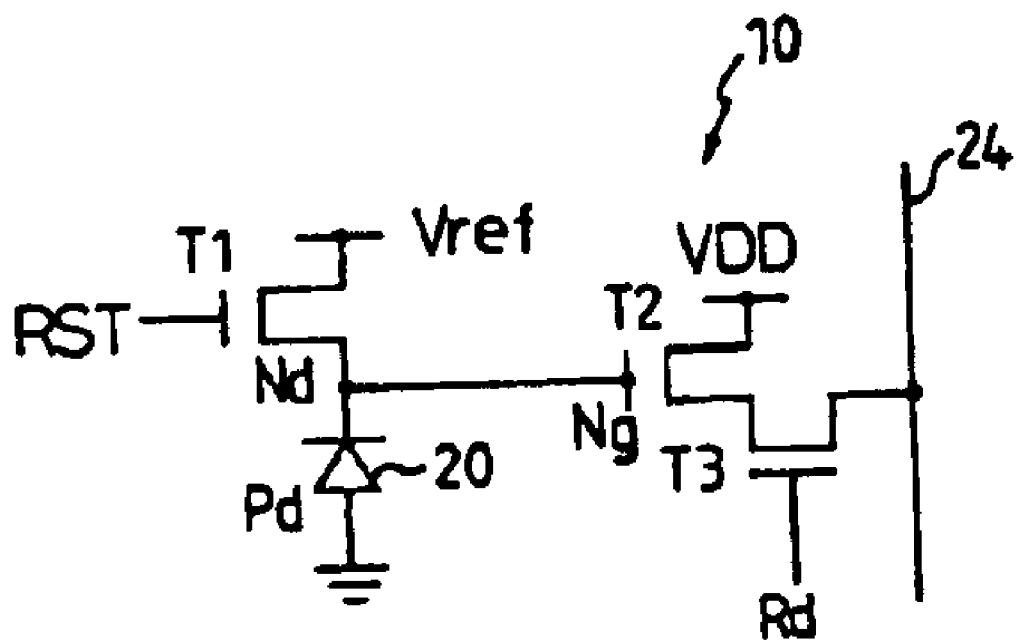
FIG. 1B shows a schematic diagram of the photocell structure of an active pixel employed in FIG. 1A.

The present application now will be described more fully (hereinafter parenthesized with reference to the accompanying drawings), in which embodiments of the invention are shown. Although one of the embodiments illustrated relates to a CMOS image sensor application, those skilled in the art will appreciate that this invention may be embodied in many different forms set forth herein. These embodiments are provided so that this disclosure will be thorough and complete, and will fully convey the scope of the invention to those skilled in the art.

Reference now will be made in detail to the preferred embodiments of the present invention as illustrated in the accompanying drawings in which like reference numerals designate like or corresponding elements throughout the drawings.

Figure 2A:
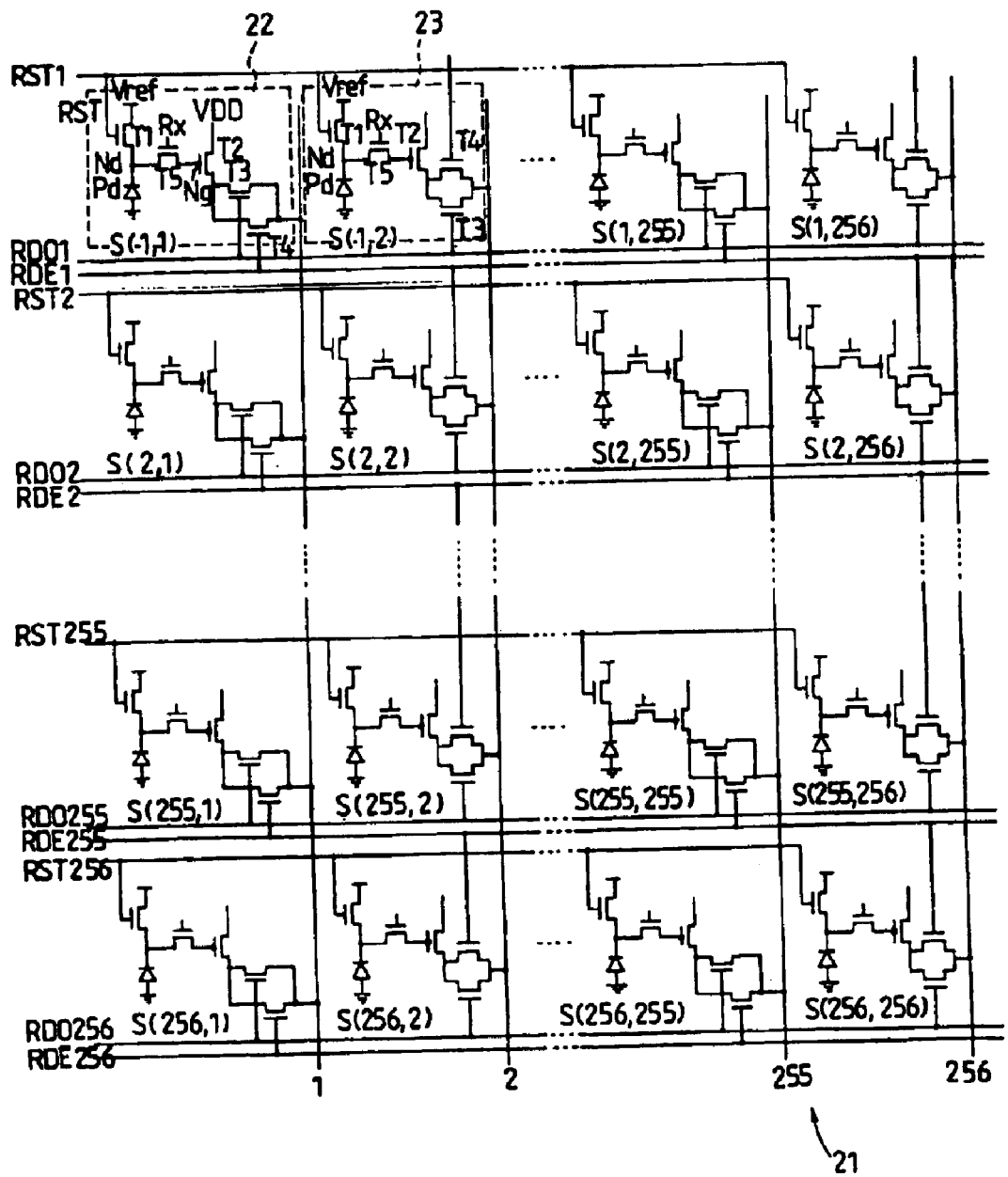
FIG. 2A shows a simplified schematic block diagram of a CMOS image sensor consisting of 256 by 256 active pixels according to one embodiment of the present invention.
Figure 2B:
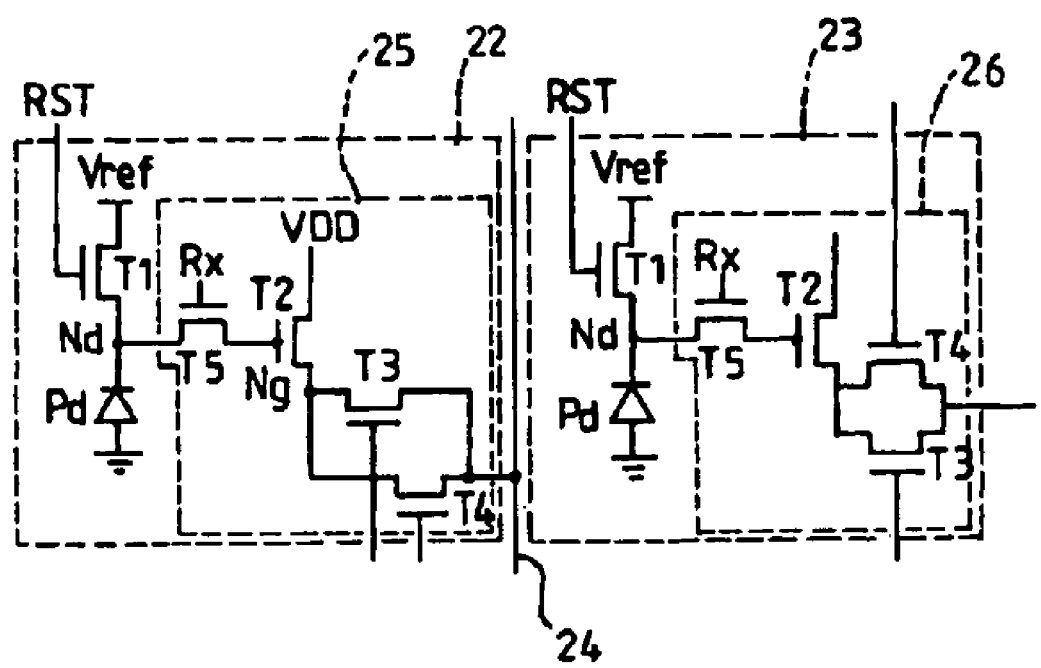
FIG. 2B shows a schematic diagram of the photocell structure of an active pixel employed in the CMOS image sensor of FIG. 2A.

FIG. 2A illustrates a CMOS image sensor array of 256 by 256 active pixels according to one preferred embodiment. Though the numbers of these pixels have been reduced for purposes of illustration, it should be understood that a more typical number of columns and rows will be adopted for the application of typical television systems. An image sensor core 21 comprises a two-dimensional pixel array consisting of light detecting elements 22 and 23, each of which includes identical circuitry as shown in FIG. 2B.

According to one embodiment of the present invention, as shown in

FIG. 2A, the CMOS image sensor core 21 has a geometric configuration of pixels comprising a plurality of first light detecting element 22 and second light detecting elements 23 arranged in rows and columns for generating respective analog signals in proportion to the intensity of the light impinging respective on one of the light detecting elements 22 and 23.

As with the conventional light detecting element 10 of FIG. 1A, the first and second light detecting elements 22 and 23 each comprises a photodiode Pd couples to the reset transistor T1 at the node Nd. The node Nd is coupled to a translating means 25 or 26 for resetting the initial state of the floating sensing point Nd and reading out said analog signals acquired by the photodiode Pd to the column line 24. The translating means 25 or 26 consists essentially of the source follower T2 and access transistor T3. Differing from the prior art, the translating means 25 or 26 further comprises another access transistor T4 coupled in parallel to the access transistor T3 and an amplifier transistor T5 coupled between the node Nd and the gate Ng of the source follower T2, wherein the access transistors T4 in two adjacent light detecting elements 22 and 23 in a row are coupled to the row activating signals RDOn and RDEn (n=1 . . . 256), respectively. A signal RX connected to the gate of the amplifier transistor T5 is a DC bias voltage regardless of even or odd frame time. The voltage of the signal RX depending on the application or fabrication process is so configured that the transistor T5 acts as an amplifier for further amplifying the signal flowing between nodes Nd and Ng. The general operation of the translating means 25 or 26 has been detailed above.

Figure 3:
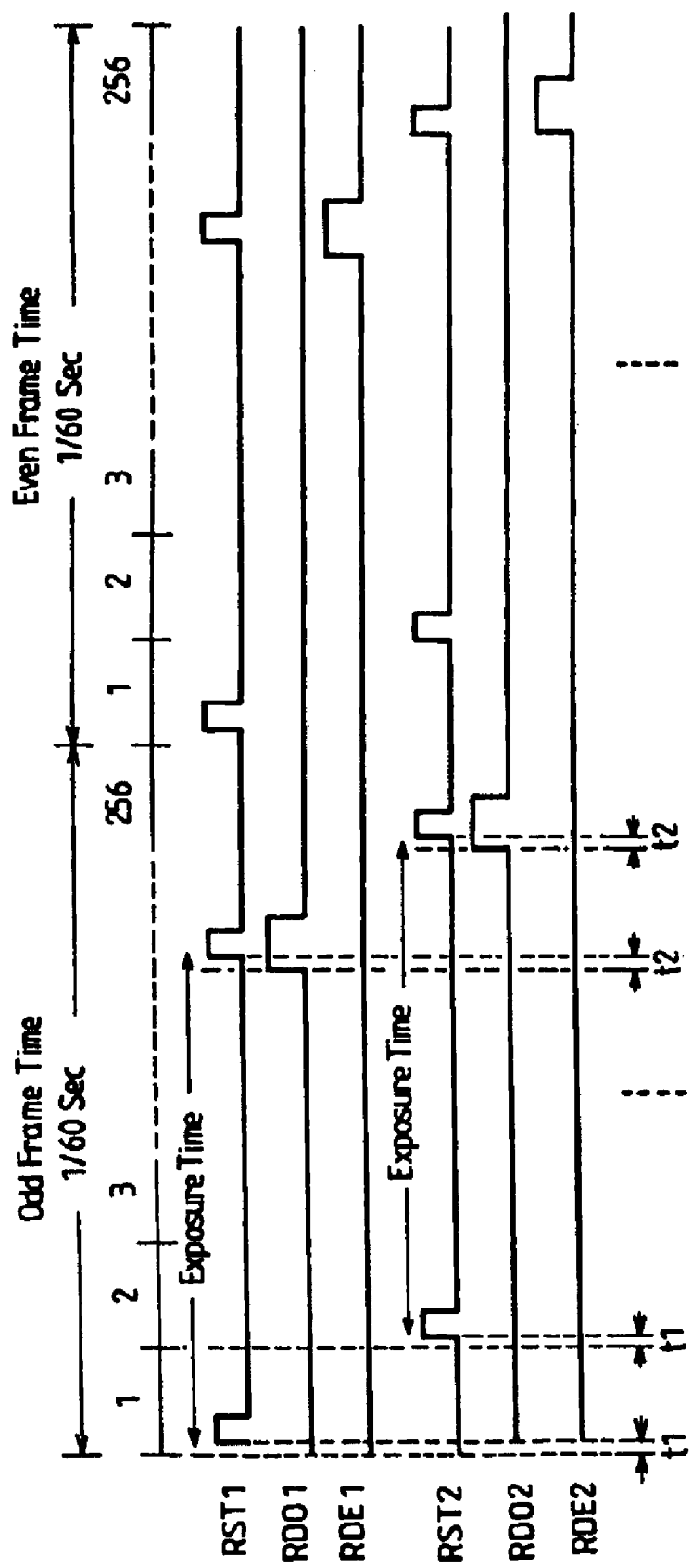
FIG. 3 illustrates a timing diagram of the signals employed in the CMOS image sensor of FIG. 2B.

For a CMOS image sensor adopted for an NTSC TV system, the pixel array is scanned 60 fields per second with odd and even fields alternatively, to achieve 30 frames per second operation. As shown in FIG. 3, during the odd field time, for the first row, the exposure time of the taken image starts right at the time when an active high signal RST1 briefly turns on the transistor T1 of the first row. The configuration that the transistor T1 is turned on by the active high signal RST1 renders the voltage level of the node Nd of the first row approximately equal to the reference voltage Vref, and also sets the voltage of the photodiode Pd to an initial reference level, wherein the voltage level of the node Ng of the first row is the gate voltage of the source follower transistor T2.

Referring to FIG. 3, according to the present invention, for the first row, active high reset signal RST1 of pulse type for activating the reset transistor T1 lags the beginning of the scan line time for row 1 for a short time interval (denoted by t1). The duration between two adjacent reset signals for row 1 is called the exposure time for row 1. The exposure time is usually designed not to exceed one single field time. The active high signal RST1 slightly lags the beginning of the scan time for row 1 so that the following correlated double sampling (CDS) circuit, described above, can acquire the two required voltage samples with adequate accuracy. Similarly, for the second row, the signals RST2 will then be turned on in the same way as RST1, right at the time when one scan line time expires after the RST1 is enabled. Similar operations are set forth for RST3, . . . and RST256 sequentially in time. Also, for the first row, at the time leading the exposure time for RST1 by a short time interval (denoted by t2), a read signal RDO1 will be at a logic high "1" to turn on the access transistor T3 to couple the source follower transistor T2 to the column line 24. Then, a short time interval later, after the rising edge of the active high RDO1 signal, RST1 will be at logic high "1" level again to turn on the reset transistor T1, thereby resetting the reference condition of Ng. The leading time t2 for RDO1 ensures that the access transistor T3 has sufficient time to be turned on and the signal transferred through the column to the input of the CDS circuit. The signal voltage difference at the column line 24 before and after the assertion of RST1 will represent the analog voltage signal of the pixel photodiode in row 1. After one scan line time, RDO2 and RST2 will be activated, and similarly for RST3, RDO3, . . . RST256, RDO256, sequentially in time. The timing operation for an even frame is similar to that for an odd frame as shown in FIG. 3.

According to one embodiment of the present invention, as shown in FIG. 2B, 256 reset signals (RST1, RST2, . . . , RST256), odd field read signals (RDO1, RDO2, . . . RDO256) and even field read signals (RDE1, RDE2, . . . RDE256) are connected to a row address shift register (not shown), the detail of which is well known in the art and will not be described herein. During the odd field time, the pixel image signal of the first row of pixels is coupled to the column lines 24 by activation of the odd field read signal RDO1. The signal delivered via the translating means to the column line 24 is thus the voltage in proportion to the intensity of the light impinging on the photodiode Pd. The reset signal RST1 is then activated to provide the reference level as needed for the conventional Correlated Double Sampling (CDS) scheme of signal processing. The second and following rows are processed as mentioned above for the remainder of the odd field, using the odd field signals RDO2, PDO3, and RDO256.

Figure 4:
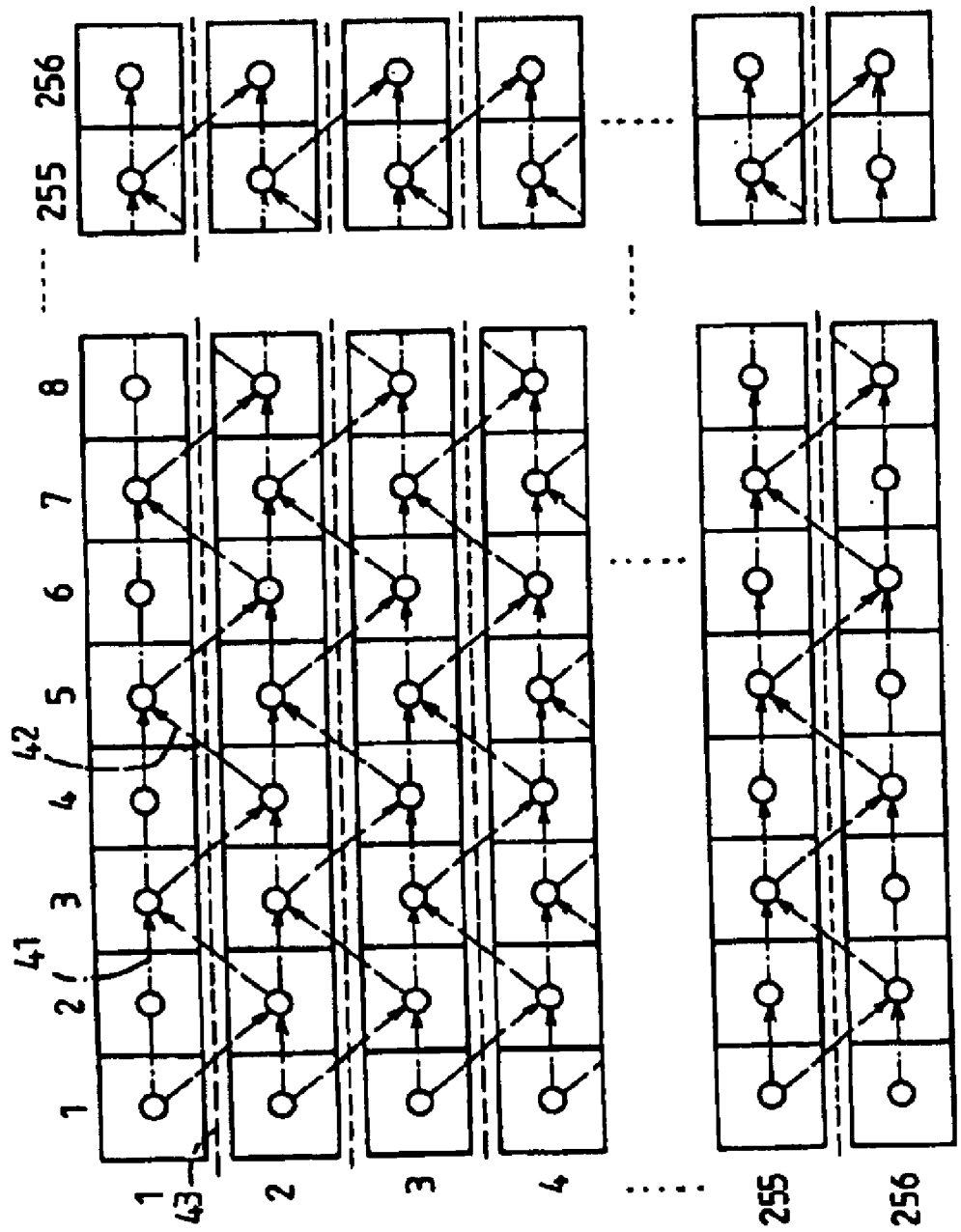
FIG. 4 shows the enabling scheme for rows of pixels during the odd field and even field according to the present invention.

For the even field, the same sequence of operations will occur, but the read signals will be RDEI, RDE2, . . . , RDE256 sequentially; The effect of using the read signals RDEn (n=1 . . . 256) is to access the pixels in a serrated arrangement as shown in FIG. 4. Especially, for example, during the even field time, the same pixels as those during the odd field time in the odd numbered columns, such as the first column, are activated. However, in the even numbered columns, such as the second column, those pixels in the next row below that of the pixels used in the odd field time are activated. As a result, during the even field time, the scanning effect achieved by the pixels alternately located in two adjacent rows is equivalent to that of those in a virtual average row location denoted by lines 43 between the two adjacent rows, or equivalently at one-half row below that of the row activated during the even field as is illustrated in FIG. 4.

According to the present invention, by scanning the array sequentially with the odd field read signals RDO1, RDO2, . . . RDO256 for the odd field and sequentially with even field read signals RDE1, RDE2, . . . RDE256 for the even field, the resultant scanning effect is equivalent to that of the conventional interlaced scanning method in an order of rows (1, 2, 3, 4, . . . 255, and 256 for the odd frame, then rows 1.5, 2.5, 3.5, 4.5, . . . , 254.5, and 255.5 for the even frame. Within the odd field scan time or even filed scan time, the analog signals sequentially received from the column lines 24 are processed by the following circuits, such as CDS circuit, analog multiplier in combination with an NTSC encoder to generate corresponding analog signals.

As shown in FIG. 4, the digital signals enabled by the odd numbered read lines RDOn (n=1 . . . 256) during the odd field time actually contains the odd image information from the rows denoted by lines 41. Similarly, the digital signals enabled by the even numbered read lines RDEn (n=1 . . . 256) during the seven field time actually contains the even image information from the odd numbered rows as well as the even numbered rows, denoted by serrate dashed lines 42. As a result, during the even field time, the scanning effect achieved by the pixels in the locations denoted by the serrated dashed lines 42 is equivalent to that of those in a virtual average row denoted by lines 43 between rows, or equivalently at one-half row below that of the row activated. In this way, the odd image information correlates with the even image information. The components of the odd field and even field are partly correlated with one another and the time difference thereof is less than 1/60 second. This approach of the invention provides better picture image quality than the known technique which repeatedly scans the same rows for both odd and even fields, since the location of picture elements will be more accurately depicted vertically. Thus, in the preferred embodiment, the CMOS active pixel image sensor 21 of the present application as shown in FIG. 2A is notably easier and less costly to manufacture than the prior art as shown in FIG. 1A, and also can improve the apparent resolution thereof.

As mentioned above, the amplifier transistor T5 is biased by the signal RX, causing the signal between nodes Nd and Ng to be amplified. According to the software simulation result, the overall sensitivity of the present invention is as much as eight times greater than the conventional scheme. One additional advantage of the present invention is that odd and even fields are passed through the same amplifier transistor T5 source follower T2 and access transistor T3, which significantly mitigates pattern noise due to process variations in the fabrication of these transistors. It is also notable that rather than 512 transistors, as in the case of conventional approach, according to the specific scheme of the present invention, only 256 reset transistors T1 source follower transistors T2, and access transistors T3 are needed, which significantly lowers the manufacturing costs, reduces the size of the image sensor core, and also reduces power consumption. As a result, the preferred embodiment method can improve the sensitivity of CMOS active pixel image sensor significantly, and makes its performance similar to that of a CCD.

Although the invention has been disclosed in terms of preferred embodiments, the disclosure is not intended to limit the invention. The invention still can be modified or varied by persons skilled in the art without departing from the scope and spirit of the invention which is determined by the claims below.

What is claimed is:

1. An image sensor for sensing the light of an image impinging thereupon and for translating the image into a standard television format, said image sensor comprising a plurality of first and second light detecting elements arranged in rows and columns for generating respective analog signals in proportion to the intensity of the light impinging respectively on each of said light detecting elements, characterized in that each row includes both said first and second light detecting elements alternately disposed and activated by first read lines to generate odd field signals, and in that said first and second light detecting elements in two adjacent rows disposed in a serrated manner are activated by second read lines to generate even field signals.

2. The image sensor of claim 1, wherein each of said first and second light detecting elements further comprises a reset transistor for resetting the initial state of a photodiode in each of said first and second light detecting elements, and a translating means comprising a source follower transistor for buffering said analog signals and two access transistors coupled in parallel to each other and connected to the output of said source follower transistor.

3. The image sensor of claim 1, wherein said light detecting elements in two adjacent rows disposed in a serrate manner activated by said second read lines substantially have average vertical location between said two adjacent rows, and wherein the components of said first and second field signals are correlated with one another and the time difference thereof is less than 1/60 second, thereby improving the quality of said image displayed in a television.

4. The image sensor of claim 1, wherein each of said first light detecting element further comprises two access transistors coupled in parallel and activated by said first read line and second read line, respectively, connected at the respective gates thereof, and wherein each of said second light detecting element comprises two access transistors coupled in parallel and activated by said first read line and another second read line, respectively, connected at the respective gates thereof.

5. A method for use in an image sensor for sensing the light of an image impinging thereupon and for translating the image into a selected television format; said image sensor comprising a plurality of first and second light detecting elements arranged in rows and columns for generating respective analog signals in proportion to the intensity of the light impinging respectively on each of said light detecting elements, the method comprising the steps of:

(1) providing a plurality of first and second light detecting elements arranged in rows and columns for generating respective analog signals in proportion to the intensity of the light impinging respectively on each of said light detecting elements, wherein each row includes both said first and second light detecting elements alternately disposed and commonly coupled to first read lines, and said first and second light detecting elements, in two adjacent rows are disposed in a serrate manner and commonly coupled to second read lines;

(2) generating respective analog signals in proportion to the intensity of the light impinging on each of said first and second light detecting elements;

(3) sequentially activating said first read lines and then said second read lines; and (4) obtaining said analog signals acquired in said first and second light detecting elements, respectively, in response to the sequential activation of said first and second read lines to generate odd field signals and even field signals, respectively.

* * * * *